United States Patent [19]

Potoczky

[11] 4,289,726

[45] Sep. 15, 1981

[54] APPARATUS AND METHOD FOR INJECTION MOLDING OF ELONGATED HOLLOW PLASTIC CONTAINER WALLS

[76] Inventor: Joseph B. Potoczky, 8975 Burke Ave., South Gate, Calif. 90280

[21] Appl. No.: 53,962

[22] Filed: Jul. 2, 1979

[51] Int. Cl.³ .............................................. B29F 1/14
[52] U.S. Cl. ............................... 264/318; 264/328.16; 264/335; 425/437; 425/556
[58] Field of Search .................... 264/335, 318, 328.16; 425/437, 556

[56] References Cited

U.S. PATENT DOCUMENTS

| | | | |
|---|---|---|---|
| 2,361,026 | 10/1944 | Greene | 264/335 |
| 2,568,129 | 9/1951 | Morris | 264/335 |
| 3,183,292 | 5/1965 | Dvoracek | 264/335 |
| 3,475,786 | 11/1969 | Pearson | 425/437 X |
| 4,080,147 | 3/1978 | Dumortier | 425/557 X |
| 4,187,271 | 2/1980 | Rolston | 264/318 X |

FOREIGN PATENT DOCUMENTS 154261 7/1932 Switzerland .......................... 264/335

*Primary Examiner*—Thomas P. Pavelko
*Attorney, Agent, or Firm*—Smyth, Pavitt, Siegemund & Martella

[57] ABSTRACT

Straight walled hollow containers may be molded without taper, according to the present invention. Two mold halves, when brought together define a cavity configured to the outer wall of a hollow plastic container to be injection molded, and also an opening at one end of the cavity to enclose the stem of a core defining the inner wall of the hollow plastic container. When the core is disposed in the cavity, it is centered within the latter. Thereby a space is provied between the inner walls of the mold halves and the outer wall of the core to receive plastic material injected under high pressure through a sprue, also defined by the inner walls of the mold halves. After injection, the plastic is cooled to just below the softening point of the plastic. At this point separation of the mold halves surrounding the outer portion of the core, is commenced and a force is applied to initiate withdrawal of the core from between the mold halves. Simultaneously therewith, air under pressure is injected into the space between the innermost end of the core within the cavity and the adjacent end of the cavity. Thereby, the air under pressure is forced between the core and the surrounding soft molded plastic to act as a bearing or lubricant to enable the core to be completely withdrawn from the cavity without damaging the molded container.

4 Claims, 8 Drawing Figures

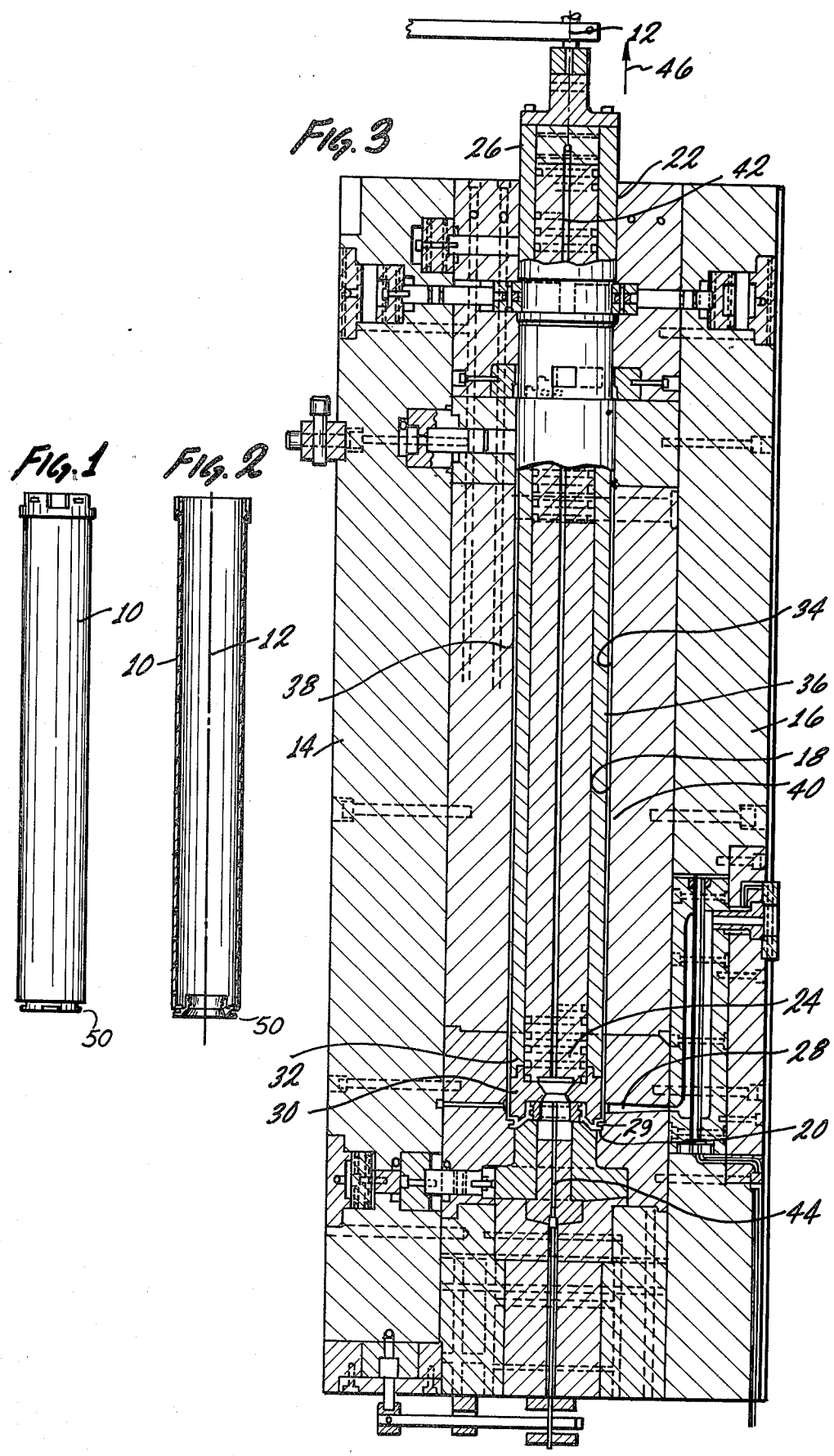

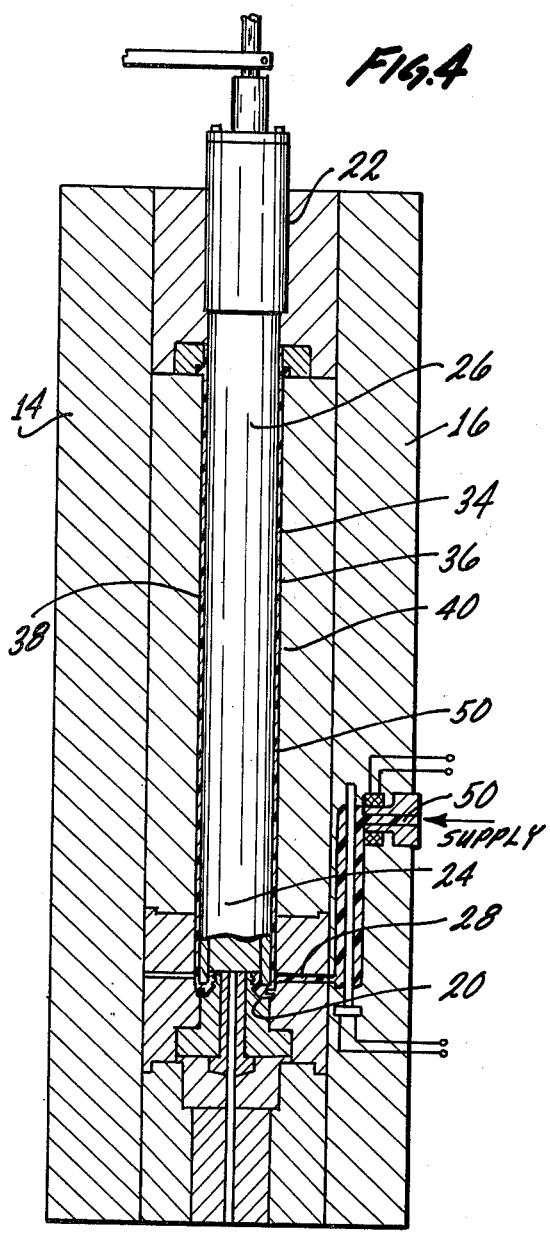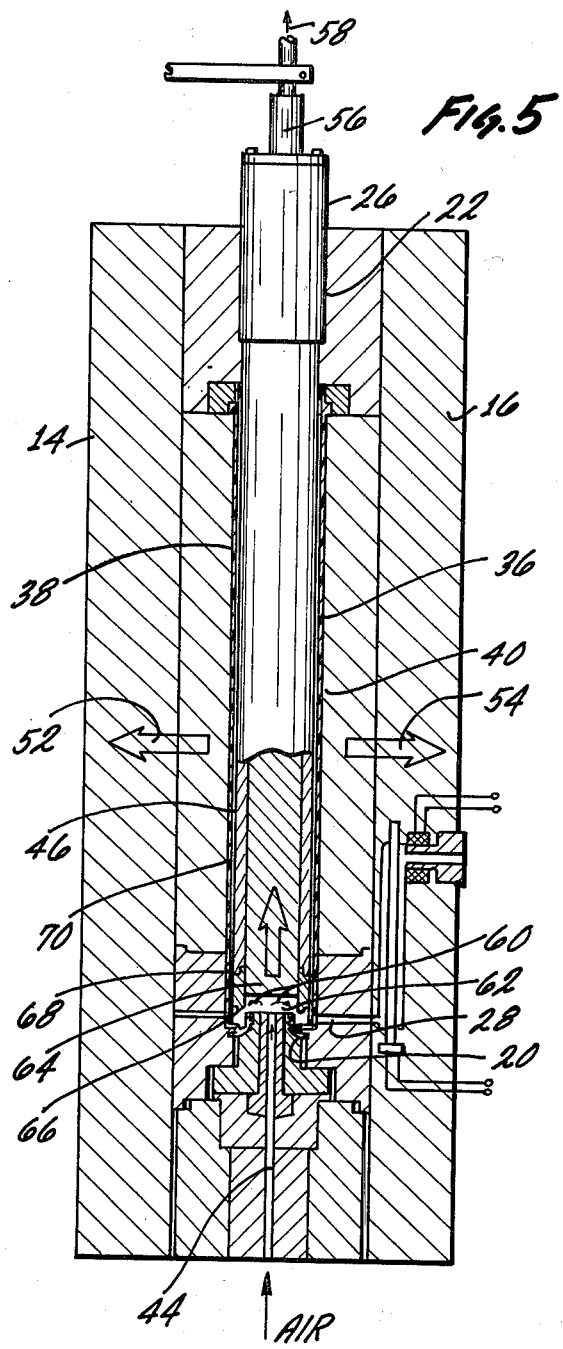

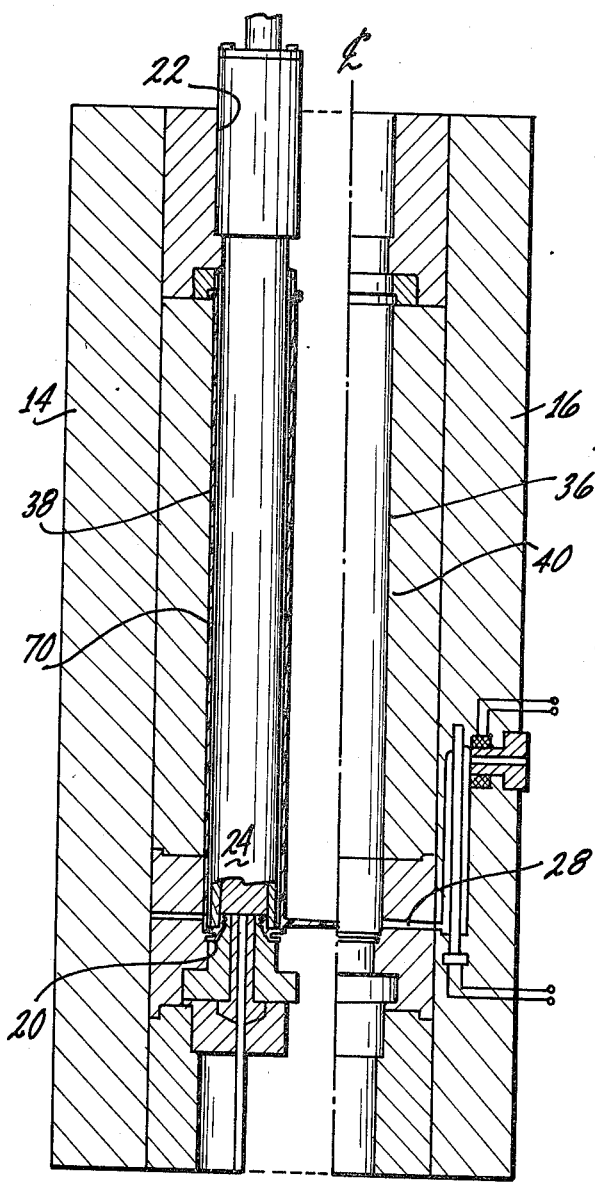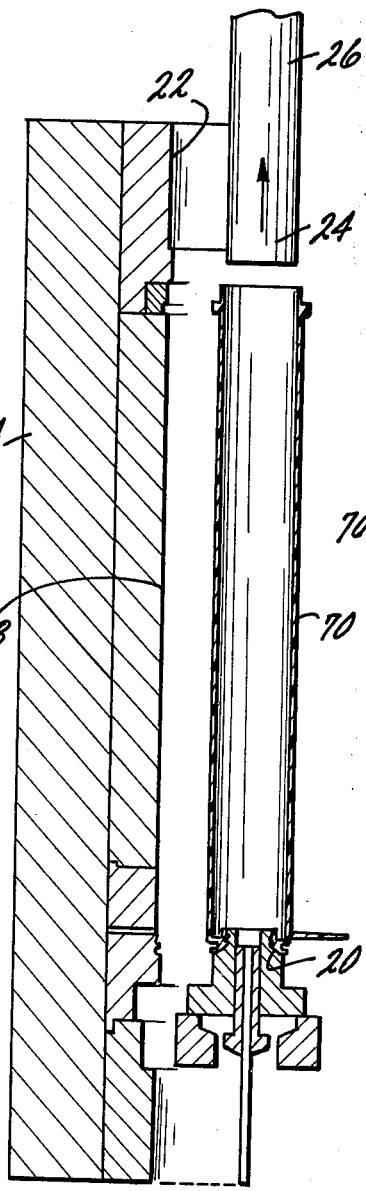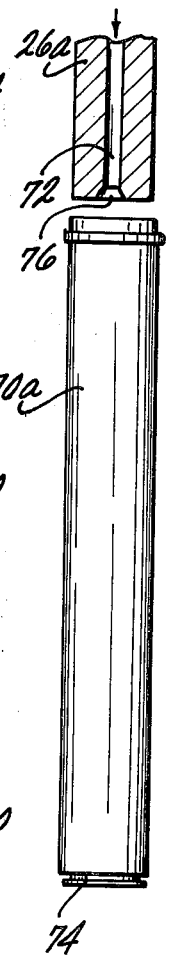

APPARATUS AND METHOD FOR INJECTION MOLDING OF ELONGATED HOLLOW PLASTIC CONTAINER WALLS

BACKGROUND OF THE INVENTION

Heretofore, when articles have been injection molded between a core element and a pair of mold halves enclosing said core element, but spaced therefrom, it has been necessary to provide a tapering of the core element such that its peripheral surface assumes at least a slight frusto-conical configuration with the smaller end of the core being that end which is first moved into the cavity defined by the two mold halves. Such tapering of the core has always been considered necessary in injection molding in order to enable the core to be withdrawn from the hollow article after the latter has been formed and the plastic material of which it has been molded, has cooled sufficiently for handling. This is because, with the cooling of the plastic material, such shrinkage occurs that, if no tapering of the core is provided, the core becomes so tightly gripped by the material that any effort forceably to pull the core out of the thus-molded article, results in damage to the latter. Conventional industry practice, therefore, has always dic-tated providing at least some tapering of the core.

While such tapering has not prevented the fabrication of many types of hollow plastic articles, where tapering of the inside wall of the article has not interfered with the use or appearance of the article, the tapering requirement has prevented injection molding of those hollow walled articles, where both the inside, as well as outside walls, have been required to be perfectly cylindrical in configuration. While certain of such cylindrical articles could be satisfactorily extruded, other articles fabricated of certain types of plastic material, have not been able to be so extruded.

Prior to the present invention, it has simply not been possible to injection mold hollow perfectly cylindrical articles in one piece. What has been done, therefore, has been to mold separately two halves of the article, by means of mating molds which can be simply pulled apart. The two separately molded halves have then been joined together along their edges by means of an adhesive, or some type of thermoplastic jointure. Articles made in this latter manner, however, will ordinarily be found to have visible seams which may not be desired in certain applications, and, in most instances, such articles may require some further machining to smooth over the seamed junctures. Such procedure, moreover, is cumbersome, time-consuming and expensive.

There has thus been a great need in the plastics industry for the development of a technique and apparatus whereby straight-walled hollow articles may be injection molded through the use of an inserted and withdrawn core: but prior to the present invention, no such technique has been developed nor has any apparatus been available for accomplishing this objective.

SUMMARY OF THE INVENTION

The present invention obviates the problem caused by the gripping of the shrunken cooled plastic about the core where the core is not tapered in the manner heretofore considered necessary in the art. According to the present invention, when the temperature of the molded plastic has been dropped just below its softening point, the mold halves are at least slightly separated and air under the pressure is provided at the innermost end of the core, while simultaneously hydraulic or other force is applied at the outer end of the core in a direction axially away from the mold cavity to withdraw the core from the mold cavity. With the injection of air under pressure, not only is an additional force applied in the same direction as the hydraulic force, to aid in the withdrawal of the core, but the air under pressure will be found to pass between the molded plastic article and the core, to counter the effect of the shrinkage of the plastic material, by forcing the molded plastic slightly radially outwardly. In effect, then, there is provided a thin air spacer or bearing between the outer wall of the core and the inner wall of the molded article. When this occurs, it will be found that the core may be withdrawn relatively easily from the molded article, and without any damage thereto. Since this process should be accomplished when the plastic material, which has been injected in the space between the mold halves and the core to form the hollow article, has reached a state just below its softening point, the molding apparatus to accomplish the process, desirably should not only include provision for cooling the core and the cavity-defining walls of the mold halves, but also some type of temperature indicator to enable the operator of the apparatus to know when the molded plastic material has dropped below the temperature at which the particular plastic material being molded, is known to soften.

While the method of the present invention is the only method known by the present inventor, whereby straight-walled hollow articles may be injection molded, and hence, has its principal utility in accomplishing such types of injection molding, it will be readily appreciated by those skilled in the injection molding art, that injecting air at the time and in the manner herein disclosed, may also be utilized to facilitate the removal of any core from a hollow molded plastic article, including a core which may be tapered to a slight frusto-conical configuration.

The present invention may be seen therefore, to open the art of injection molding to the fabrication of straight-walled hollow plastic articles without the cumbersome process of molding the article in two halves, and then joining the two halves in the manner heretofore practiced, and with a less satisfactory product.

BRIEF DESCRIPTION OF THE DRAWINGS

In the accompanying drawings,

FIG. 1 is a side elevation of a finished tubular article which has been molded in accordance with the present invention.

FIG. 2 is a vertical section of the article shown in FIG. 1.

FIG. 3 is a view, partly in section, of apparatus constructed in accordance with the present invention, whereby the method of molding of the invention may be accomplished.

FIG. 4 is a schematic view of the apparatus of FIG. 3, showing the completion of the injection of the plastic material.

FIG. 5 is a view similar to FIG. 4, but illustrating the commencement of the separation of the mold halves and the admission of air under pressure at the end of the core.

FIG. 6 is a view similar to FIGS. 4 and 5, but illustrating the complete separation of the mold halves.

FIG. 7 is a further view similar to the left half of FIG. 6, but illustrating the complete removal of the core and the ejection of the article from said mold half.

FIG. 8 is a partial view of an alternate mold core and a molded article closed at one end.

DESCRIPTION OF THE PREFERRED EMBODIMENT

It is an object of the present invention to enable a straight walled container, such as the cylinder 10 illustrated in FIGS. 1 and 2, to be injection molded. It will be noted that the cylinder 10 is constituted of a wall, both the inside and outside of which are parallel to the axis 12 of this cylindrical object. As hereinabove explained, prior to the present invention, it has not been possible for an article of this exact configuration to be injection molded, since prior art molding techniques have required some tapering of at least the internal wall of the hollow object, in order to enable the core, by which the object has been formed, to be withdrawn from the article after the injected plastic has cooled and the mold halves have been opened.

Apparatus to enable the injection molding of a cylindrical article to be accomplished in accordance with the present invention is illustrated in FIG. 3. This apparatus is comprised of two mold halves, 14 and 16, which, when brought together in proper alignment, define a cavity 18, one end 20 of which is closed, and the other end 22 of which is provided with an opening to receive and surround the outer end or stem 24 of a core 26. The mold halves are provided with a reentrant means such as recess 29 for defining a projection 50 on the article, the latter being used as a means of interlocking the article and the mold halves 14, 16 as the core is withdrawn. At least one of the mold halves 14, 16, in this instance, 16, is provided with a sprue 28, through which molten plastic may be injected into the cavity 18. Means 30 are provided at the end 20 of the cavity 18 centrally to seat the inner-end 32 of the core 26, in such a manner as to provide spacing 34 between the inner cavity-defining walls 36, 38 of the mold halves 16 and 14, respectively, and the outer wall 40 of the core 26.

In the embodiment of the invention illustrated in FIG. 3, a system of internal passages 42 is provided to enable water or another liquid coolant to be circulated through the core in order to cool the same and the plastic material after its injection into the spacing 34 to surround the outer wall 40 of the core 26. An air passage 44 is provided to extend through the centering means 30. In addition, hydraulic means, not shown, may be provided at the end 24 of the core, to apply a force in the direction of the arrow 46, to withdraw the core 26 from the molded plastic article 70, and from the mold cavity 18 after the mold halves 14 and 16 have been at least, slightly separated.

It will be noted that the inner walls 36 and 38 of the mold halves 16 and 14 respectively, and the outer wall 40 of the core, are all parallel to the axis 12. Hence, no taper is provided as has been the practice in conventional injection molding of elongated hollow articles.

The apparatus thus illustrated in FIG. 3, may be employed to practice the method of the present invention in the manner illustrated in FIGS. 4 through 7 inclusive. In the practice of this method, referring first to FIG. 4, after the two mold halves 14 and 16 have been closed with the core 26 inserted in the mold cavity 34, molten plastic 50 is fed through the sprue 28 under pressure until it fills the space 34. After the space 34 has been thus completely filled with the molten plastic 50, the core and/or the cavity walls are cooled, e.g. through the system 42 in the case of the core 26, until the core temperature is dropped to just below the temperature at which the plastic 50 is known to soften. At this point, separation of the mold halves 14 and 16 is initiated in the directions of the arrows 52 and 54 (FIG. 5) until the molds are separated to the extent illustrated in FIG. 6. However, as the mold separation is thus initiated, as indicated FIG. 5, a hydraulic or other force is applied to the top end 56 of the core 26 in the direction of the arrow 58, while simultaneously, air under pressure 60 is forced through the passage 44 and into the area 62, defined by the lower end 64 of the core 26, and the centering means 30. Thereby, this air under pressure 60 passes in the direction of the arrows 66 into the very small annular space 68, between the then molded plastic article 70 and the outer wall 40 of the core 26, to force the molded plastic article 70 radially outwardly, sufficiently to enable the air passing up the annular space 68 to serve as a spacer or bearing between the core 26 and the molded article 70. The core 26 may then be readily withdrawn from the article in the manner illustrated in FIG. 7.

While, in the embodiment of the apparatus of the invention illustrated in FIGS. 3 through 7 inclusive, provision is made for admitting the air under pressure through the passage 44 in the mold centering means 30, it would also be possible to bring the air under pressure in through a passage 72, provided in the core 26a, in the manner illustrated in FIG. 8. This embodiment of the apparatus of the present invention would be particularly suitable where it might be desired to injection mold a straight-walled container 70a, which is closed at one end 74, as also illustrated in FIG. 8. In this embodiment obviously it would be desirable to provide a poppit valve 76 at the end of the core 26a, which poppit valve 76 would normally be closed, but would open under sufficient air pressure in the passage 72.

From the foregoing, it may readily be understood how straight-walled containers, or other articles may be injection molded and without the necessity of having the walls of the resulting articles tapered in order to enable the mold core to be withdrawn from the article.

While the present invention is particularly useful in, and constitutes the only method known for injection molding of articles having walls parallel to the axis of the article, the method may also be employed to facilitate the withdrawal of a mold or from many other types of articles, including those which may have walls with a frusto-conical taper.

I claim:

1. The method of injection molding an elongated hollow plastic article having its internal sidewalls parallel to itself through to form an article having a cylindrical interior shape of arbitrary cross-section, said method comprising:

a. providing a pair of mold halves which, when brought together, define a cavity closed at one end, said mold halves providing (i) a sprue through which molten plastic material may be injected into the cavity under pressure, and (ii) an opening at the other end of said cavity through which one end of a core extends axially, the sidewall of said mold halves being provided with reentrant means for defining a projection on said molten article extending radially into said mold halves for restraining said article from axial movement during unmolding;

b. disposing a core in said cavity with one end extending in close fit relation through said opening in the mold halves, said core having its sidewalls parallel and defining the interior of said article, and spaced from the sidewalls of said cavity;

c. disposing a core centering element between the innermost cavity-defining walls of the mold halves;

d. when said core has been disposed in said cavity, causing molten plastic to be injected under high pressure through said sprue to fill the space between the core sidewalls and the sidewalls defining said cavity, said plastic being of a type which sets into a rigid substantially non-extendable member upon cooling;

e. cooling said injected molten plastic to a temperature approximately just below the softening point of said injected plastic to thereby form said article, and while at such temperature and therefore while article is slightly yieldable, simultaneously f. commencing the separation of said mold halves from each other while maintaining said reentrant means in contact with said projection and simultaneously applying a force directed axially out of said opening and against the restraint of said projection to withdraw said core from said thus formed article and also simultaneously providing air under pressure at the innermost end of said thus-formed article in the cavity and air-under-pressure admitted through a passage provided in said centering element to whereby said air-under-pressure is forced between the outer end and sidewalls of said core and the thus-formed article to forceably expand the article radially outward and cause a small air gap to be established between said core and said article to thereby facilitate the withdrawal of the core from the same;

g. completing the separation of the mold halves;

h. and, ejecting the thus-formed article from such mold half as it may have remained in, after the mold halves have been completely separated.

2. The method of injection molding an elongated hollow plastic article having its internal sidewalls parallel to itself throughout to form an article having a cylindrical interior shape of arbitrary cross-section, said method comprising providing a pair of mold halves which, when brought together, define a cavity closed at one end, said mold halves providing (i) a sprue through which molten plastic material may be injected into the cavity under pressure, and (ii) an opening at the other end of said cavity through which one end of a core which extend axially, the sidewall of said mold halves being provided with reentrant means for defining a projection on said molten article extending radially into said mold halves for restraining said article from axial movement during unmolding;

b. disposing a core in said cavity with one end extending in close fit relation through said opening in the mold halves, said core having its sidewalls parallel and defining the interior of said article, and spaced from the sidewalls of said cavity;

c. when said core has been disposed in said cavity, causing molten plastic to be injected under high pressure through said sprue to fill the space between the core sidewalls and the sidewalls defining said cavity, said plastic being of a type which sets into a rigid substantially non-extendable member upon cooling;

d. Cooling said injected molten plastic to a temperature approximately just below the softening point of said injected plastic to thereby form said article, and while at such temperature and therefore while article is slightly yieldable, simultaneously;

e. commencing the separation of said mold halves from each other, while maintaining said reentrant means in contact with said projection and simultaneously applying a force directed axially out of said opening and against the restraint of said projection to withdraw said core from said thus formed article and also simultaneously providing air under pressure at the innermost end of said thus-formed article in the cavity whereby said air under pressure is forced between the outer end and sidewalls of said core and the thus-formed article to forceably expand the article radially outward and cause a small air gap to be established between said core and said article to thereby facilitate the withdrawal of the core from the same;

f. completing the separation of the mold halves;

g. and, ejecting the thus-formed article from such mold half as it may have remained in, after the mold halves have been completely separated.

3. The method as described in claim 2 wherein the air, under pressure is admitted through a passage extending from the outer to the inner end of the core.

4. The method as described in claim 2 wherein the article is cylindrical.

* * * * *